United States Patent [19]

Yong et al.

[11] 4,289,540
[45] Sep. 15, 1981

[54] HYDROLYZED STARCH-CONTAINING COMPOSITIONS

[75] Inventors: Raymond N. Yong; Amar J. Sethi, both of Beaconsfield, Canada

[73] Assignee: Suncor Inc., Toronto, Canada

[21] Appl. No.: 934,560

[22] Filed: Aug. 17, 1978

[30] Foreign Application Priority Data

Jan. 30, 1978 [CA] Canada .................................. 295881
Aug. 2, 1978 [CA] Canada .................................. 308619

[51] Int. Cl.$^3$ .............................................. C13L 1/08
[52] U.S. Cl. ...................................... 127/33; 106/210; 127/32; 127/38; 127/70; 210/729
[58] Field of Search ...................... 127/32, 38, 33, 70, 127/71; 536/102

[56] References Cited

U.S. PATENT DOCUMENTS

| | | | |
|---|---|---|---|
| 1,862,265 | 6/1932 | Henry | 210/47 X |
| 2,051,983 | 8/1936 | Campbell | 204/1 |
| 2,085,828 | 7/1937 | Rice | 210/23 |
| 2,264,448 | 12/1941 | Moller | 210/23 |
| 2,374,676 | 5/1945 | Gardner | 127/38 |
| 2,468,207 | 4/1949 | Kerr | 127/38 X |
| 2,585,651 | 2/1952 | Hart | 127/38 X |
| 2,619,428 | 11/1952 | Kerr | 127/38 X |
| 2,660,303 | 11/1953 | Haseman | 209/5 |
| 2,806,026 | 9/1957 | Evans | 127/32 X |
| 2,975,124 | 3/1961 | Coldwell | 210/54 |
| 2,993,041 | 7/1961 | Sietsema | 127/32 X |
| 2,995,513 | 8/1961 | Paschall | 210/54 |
| 3,117,892 | 1/1964 | Patel | 127/71 X |
| 3,142,637 | 7/1964 | Cook | 127/32 X |
| 3,264,174 | 8/1966 | Aitken | 536/102 X |
| 3,455,715 | 7/1969 | Niilo-Ramd | 127/71 X |
| 3,640,842 | 2/1972 | Hullinger | 127/71 X |
| 3,962,079 | 6/1976 | Hunt | 210/47 |
| 3,977,897 | 8/1976 | Wurzburg | 536/102 X |
| 4,040,862 | 8/1977 | Voigt | 127/38 X |

*Primary Examiner*—Sidney Marantz
*Attorney, Agent, or Firm*—J. Edward Hess; Donald R. Johnson; Paul Lipsitz

[57] ABSTRACT

Hydrolyzed wheat, corn, and potato starches are effective flocculants in destabilizing dilute as well as thick sludge suspensions. These starches are equal to, or better than, the synthetic polyacrylamide flocculants in destabilizing sludge suspensions, particularly when used in the treatment of bituminous tar sands tailings.

The hydrolyzed wheat starch is especially effective when first contacted with metal salts such as salts containing calcium, aluminum and phosphate ions and most particularly when first treated with a combination of such salts formed in situ, and a lower aliphatic alcohol.

Among the potato starch flocculants which were found to be generally better than the corn starch flocculants, those containing $AlPO_4$ were the best. Potato starch flocculants are equally effective on oil-removed and no-oil-removed sludge suspensions.

It also has been found that when cement is added together with the aforedescribed composition, there is achieved improved permeability and shear strength of the resulting sludge.

8 Claims, 1 Drawing Figure

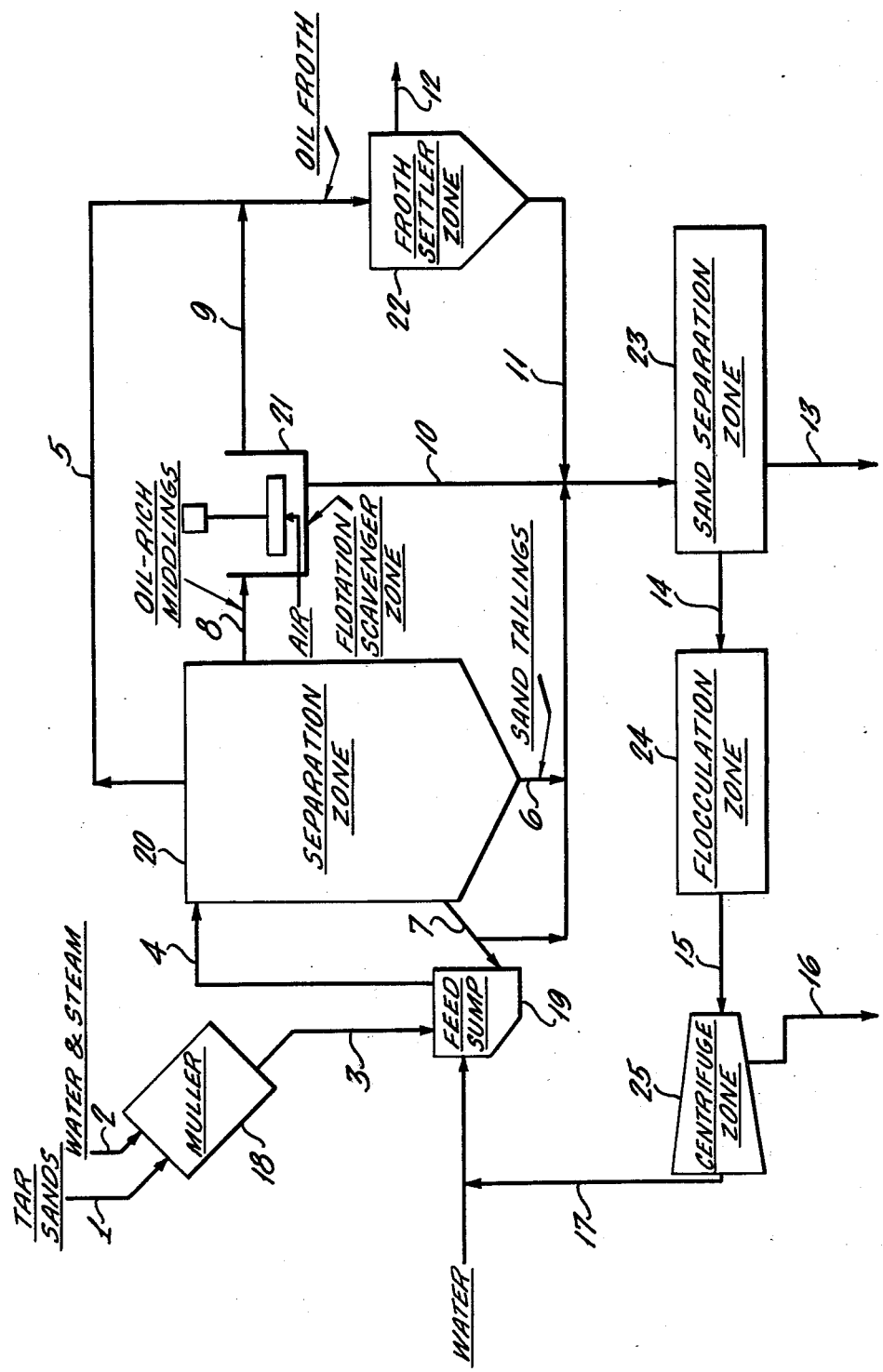

HYDROLYZED STARCH-CONTAINING COMPOSITIONS

BACKGROUND OF THE INVENTION

This invention relates to novel hydrolyzed wheat, corn, or potato starch compositions and process for making and using the same. More particularly, this invention relates to the discovery that hydrolyzed wheat, corn, and potato starch are effective flocculants in destabilizing dilute as well as thick sludge suspensions.

In general, these suspensions are aqueous colloidal suspensions containing either clay minerals or metal oxides-hydroxides which are formed in large volume during mining operations in the recovery of such materials as coal, bitumen from tar sands, and metals. In the case of metal mining operations, suspensions known as slimes are formed, typically phosphate slimes or like materials produced in the mining of copper, nickel, and titanium. In coal and tar sands minings, for example, the mining effluent typically contains dilute or thick clay mineral suspensions.

In order to properly dispose of these voluminous mining discharges, regardless of their source, flocculants have conventionally been employed to destabilize these suspensions and thus permit the effective separation of water from solids.

In one particular aspect, this invention relates to the treatment of tailing pond water obtained from the hot water process for treating bituminous sands, such as Athabasca tar sands, and, more particularly, to the treatment of the water and clay-containing effluent discharged from the process with a hydrolyzed wheat starch.

In a further particular aspect of this invention, it relates to the treatment of phosphate slime conventionally obtained in phosphate mining operations.

Tar sands (which are also known as oil sands and bituminous sands) are sand deposits which are impregnated with dense, viscous petroleum. Tar sands are found throughout the world, often in the same geographical area as conventional petroleum. The largest deposit, and the only one of present commercial importance, is in the Athabasca area in the northeast of the Province of Alberta, Canada. This deposit is believed to contain over 700 billion barrels of bitumen. For comparison, this is just about equal to the world-wide reserves of conventional oil, 60% of which is found in the middle east.

Athabasca tar sand is a three-component mixture of bitumen, mineral and water. Bitumen is the value for the extraction of which tar sands are mined and processed. The bitumen content is variable, averaging 12 wt.% of the deposit, but ranging from 0 to 18 wt.%. Water typically runs 3 to 6 wt.% of the mixture, increasing as bitumen content decreases. The mineral content is relatively constant ranging from 84 to 86 wt.%.

Several basic extraction methods have been known for many years for separating the bitumen from the sands. In the so-called "cold water" method, the separation is accomplished by mixing the sands with a solvent capable of dissolving the bitumen constituent. The mixture is then introduced into a large volume of water, water with a surface agent added, or a solution of a neutral salt in water. The combined mass is then subjected to a pressure or gravity separation.

The hot water process for primary extraction of bitumen from tar sands consists of three major process steps (a fourth step, final extraction, is used to clean up the recovered bitumen for downstream processing.) In the first step, called conditioning, tar sand is mixed with water and heated with open steam to form a pulp of 70 to 85 wt.% solids. Sodium hydroxide or other reagents are added as required to maintain pH in the range 8.0–8.5. In the second step, called separation, the conditioned pulp is diluted further so that settling can take place. The bulk of the sand-size miner rapidly settles and is withdrawn as sand tailings. Most of the bitumen rapidly floats (settles upward) to form a coherent mass known as froth which is recovered by skimming the settling vessel. This stream, called the middlings drag stream, may be subjected to a third processing step, scavenging. This step provides incremental recovery of suspended bitumen and can be accomplished by conventional froth flotation.

The mineral particle size distribution is particularly significant to operation of the hot water process and to sludge accumulation. The terms sand, silt, clay, and fines are used in this specification as particle size designations wherein sand is siliceous material which will not pass a 325 mesh screen. Silt will pass 325 mesh, but is larger than 2 microns, and clay is material smaller than two microns including some siliceous material of that size.

Conditioning tar sands for the recovery of bitumen consists of heating the tar sand/water feed mixture to process temperature (180°–200° F.), physical mixing of the pulp to uniform composition and consistency, and the consumption (by chemical reaction) of the caustic or other reagents added. Under these conditions, bitumen is stripped from the individual sand grains and mixed into the pulp in the form of discrete droplets of a particle size on the same order as that of the sand grains. The same process conditions, it turns out, are also ideal for accomplishing deflocculation of the clays which occur naturally in the tar sand feed. Deflocculation, or dispersion, means breaking down the naturally occurring aggregates of clay particles to produce a slurry of individual particles. Thus, during conditioning, a large fraction of the clay particles become well dispersed and mixed throughout the pulp.

Those skilled in the art will therefore understand that the conditioning process, which prepares the resource (bitumen) for efficient recovery during the following process steps also prepares the clays to be the most difficult to deal with in the tailings disposal operations.

The second process step, called separation, is actually the bitumen recovery step, (the separation having already occurred during conditioning). The conditioned tar sand pulp is screened to remove rocks and unconditionable lumps of tar sands and clay. The reject material, "screen oversize", is discarded. The screened pulp is further diluted with water to promote two settling processes: globules of bitumen, essentially mineral-free, settle (float) upward to form a coherent mass of froth on the surface of the separation cells; and, at the same time, mineral particles, particularly the sand size mineral, settle down and are removed from the bottom of the separation cell as tailings. The medium through which these two settling processes take place is called the middlings. Middlings consists primarily of water, with suspended fine material and bitumen particles.

The particles sizes and densities of the sand and of the bitumen particles are relatively fixed. The parameter which influences the settling processes most is the viscosity of the middlings. Characteristically, as the fines content rises above a certain threshold (which varies according to the composition of the fines), viscosity rapidly achieves high values with the effect that the settling processes essentially stop. In this operating condition, the separation cell is said to be "upset". Little or no oil is recovered, and all streams exiting the cell have about the same composition as the feed.

As feed fines content increases, more water must be used in the process to maintain middlings viscosity within the operable range.

The third step of the hot water process is scavenging. The feed fines content sets the process water requirement through the need to control middlings viscosity which, as noted above, is governed by the clay/water ratio. It is usually necessary to withdraw a drag stream of middlings to maintain the separation cell material balance, and this stream of middlings can be scavenged for recovery of incremental amounts of bitumen. Air flotation is an effective scavenging method for this middlings stream.

Final extraction or froth clean-up is usually accomplished by centrifugation. Froth from primary extraction is diluted with naptha, and the diluted froth is then subjected to a two stage centrifugation. This process yields an oil product of an essentially pure (diluted) bitumen. Water and mineral removed from the froth constitute an additional tailing stream which must be disposed of.

In the terminology of extractive processing, tailings is the throwaway material generated in the course of extracting the valuable material from an ore. In tar sands processing, tailings consist of the whole tar sand ore body plus net additions of process water less only the recovered bitumen product. Tar sand tailings can be subdivided into three categories; vis: (1) screen oversize, (2) sand tailings (the fraction that settles rapidly), and (3) tailings sludge (the fraction that settles slowly). Screen oversize is typically collected and handled as a separate stream.

Tailings disposal is all the operations required to place the tailings in a final resting place. One obvious long-range goal of tailings disposal is to return the tailings to the mined out area in a satisfactory form. Thus, there are two main operating modes for tailings disposal: (1) dike building-hydraulic conveying of tailings followed by mechanical compaction of the sand tailings fraction; and (2) overboarding-hydraulic transport with no mechanical compaction.

Recently, in view of the high level of ecological consciousness in Canada and the United States, technical interest in tar sands operation has begun to focus on tailings disposal. The concept of tar sands tailings disposal is straightforward. Visualize mining one cubic foot of tar sands. This leaves a one cubic foot hole in the ground. The ore is processed to recover the resource (bitumen) and the remainder, including both process material and the gangue constitutes the tailings; tailings that are not valuable and are to be disposed of. In tar sands processing, the main process material is water and the gangue is mostly sand with some silt and clay. Physically, the tailings consists of a solid part (sand tailings) and a more or less fluid part (sludge). The most satisfactory place to dispose of these tailings is, of course, the existing one cubic foot hole in the ground. It turns out, however, that the sand tailings alone from the one cubic foot of ore occupy just about one cubic foot. The amount of sludge is a variable, depending on ore quality and process conditions, but may run up to 0.3 cubic feet. Thus, the tailings simply will not fit back into the original hole in the ground.

The historical literature covering the hot water process for the recovery of bitumen from tar sands contains little in the way of a recognition that a net accumulation of liquid tailings or sludge would occur. Based on analysis of field test unit operations which led to the Great Canadian Oil Sands plant design near Ft. McMurray, Alberta, the existence of sludge accumulation was predicted. This accumulation came to be called the "pond water problem". Observations during start-up and early commercial operations at Ft. McMurray (1967-69) were of insufficient precision to confirm the prediction. Since 1969, commercial operating data have confirmed the accumulation in GCOS' tailings disposal area of a layer of fine material and water (sludge) which settles and compacts only very slowly, if at all, after a few years.

At the GCOS plant, for dike building, tailings are conveyed hydraulically to the disposal area and discharged onto the top of a sand dike which is constructed to serve as an impoundment for a pool of liquid contained inside. On the dike, sand settles rapidly, and a slurry of fines, water, and minor amounts of bitumen flows into the pond interior. The settled sand is mechanically compacted to build the dike to a higher level. The slurry which drains into the pond interior commences stratification in settling over a time scale of months to years. As a result of this long-term settling, two layers form. The top 5 to 10 feet of the pool are a layer of relatively clear water containing 0 to 5 wt.% solids. Below this clear water layer is a discontinuity in solids content. Over a matter of a few feet, solids content increases to 10-15 wt.%, and thereafter, solids content increases regularly toward the pond bottom. In the deepest parts of the pond, solid contents of over 50 wt.% have been recorded. This second layer is called the sludge layer. The solids content of the sludge layer increases regularly from top to bottom by a factor of 4-5. The clay-water ratio in this layer increases also, but by a lower factor of 1.5-2.5. The clays, dispersed during processing, apparently have partially reflocculated into a very fragile gel network. Through this gel, fines of larger-than-clay sizes are slowly settling.

Overboarding is the operation in which tailings are discharged over the top of the sand dike directly into the liquid pool. A rapid and slow settling process occur but their distinction is not as sharp as in dike building and no mechanical compaction is carried out. The sand portion of the tailings settles rapidly to form a gently sloping beach extending from the discharge point toward the pond interior. As the sand settles, fines and water drain into the pool and commence long-term settling.

In summary: (1) tar sands contain clay minerals, (2) in the hot water extraction process, most of the clays become dispersed in the process streams and traverse the circuit, exiting in the tailings, (3) the amount of process water input is fixed by the clay content of the feed and the need to control viscosity of the middlings stream, (4) the amount of water required for middlings viscosity control represents a large volume relative to the volume of the ore itself, and (5) upon disposal, clays settle only very very slowly; thus, the process water component of tailings is only partially available for reuse via recycle. That which can't be recycled represents a net accumulation of tailings sludge.

The pond water problem is then: to devise long-term economically and ecologically acceptable means to eliminate, minimize, or permanently dispose of, the accumulation of liquid tailings or sludge.

Flocculation of the drag stream in order to improve the settling characteristics thereto has been proposed and practiced in the prior art. In flocculation, individual particles (in this case clay particles) are united into rather loosely bound agglomerates or flocs. The degree of flocculation is controlled by the probability of collisions between the clay particles and their tendency toward adhesion after collision. Agitation increases the probability of collision and adhesion tendency is increased by the addition of flocculants.

Reagents act as flocculants through one or a combination of three general mechanisms: (1) neutralization of the electrical repulsive forces surrounding the small particles which enables the van der Waals cohesive force to hold the particles together once they have collided; (2) precipitation of voluminous flocs, such as metal hydroxides, that entrap fine particles; and (3) bridging of particles by natural or synthetic, long-chain, high-molecular-weight polymers. These polyelectrolytes are believed to act by adsorption (by ester formation or hydrogen bonding) of hydroxyl or amide groups on solid surfaces, each polymer chain bridging between more than one solid particle in the suspension.

Among the various reagents which have been found useful for flocculating clay are: aluminum chloride, polyalkylene oxides, such as polyethylene oxide, compounds of calcium such as calcium hydroxide, calcium oxide, calcium chloride, calcium nitrate, calcium acid phosphate, calcium sulfate, calcium tartrate, calcium citrate, calcium sulfonate, calcium lactate, the calcium salt of ethylene diamine tetraacetate and similar organic sequestering agents. Also useful are quar flour or a high molecular weight acrylamide polymer such as polyacrylamide or a copolymer of acrylamide and a copolymerizable carboxylic acid such as acrylic acid. Additional flocculants which have been considered include the polymers of acrylic or methacrylic acid derivitives, for example, acrylic acid, methacrylic acid, the alkali metal and ammonium salts of acrylic acid or methacrylic acid, acrylamide, methacrylamide, the aminoalkyl acrylates, the aminoalkyl acrylamides, the aminoalkyl methacrylamides and the N-alkyl substituted aminoalkyl esters of either acrylic or methacrylic acids.

Those skilled in the art will understand that a satisfactory solution to the "pond water problem" must be economically, as well as ecologically acceptable.

OBJECTS OF THE INVENTION

It is, therefore, an object of this invention to provide an effective flocculant in destabilizing dilute as well as thick sludge suspensions, particularly colloidal suspensions obtained from mining operations.

It is a further object of our invention to provide an effective flocculating agent for treating tar sands tailing streams which carry suspended clay particles.

It is another object of our invention to provide such a flocculating agent which is economical to prepare and employ in the treatment of both tar sands tailing streams, and phosphate slimes obtained from phosphate mining operations.

In another aspect, it is yet another object of our invention to provide such a flocculant which is safe and easy to handle and which itself offers no ecologically undesirable side effects.

BRIEF SUMMARY OF THE INVENTION

In accordance with the present invention, it has been found that the foregoing and other objects may be achieved by employing a hydrolyzed wheat, corn or potato starch as a flocculant in destabilizing dilute as well as thick sludge suspensions. More particularly, it has been found that when these starches have been hydrolyzed in the presence of metal salts, there is formed a highly effective composition for destabilizing such suspensions. Still more particularly, an especially effective flocculant composition may be prepared when calcium aluminum phosphate wheat starch is used in combination with a lower aliphatic alcohol. Alternatively, there may be employed $AlPO_4$ potato starch.

As aforestated, the sludges being treated in accordance with this invention are aqueous colloidal suspensions containing either clay minerals or metal oxides-hydroxides which are formed during mining operations. For sake of illustration, and simplicity only, the following description will be directed to a colloidal clay suspension obtained from bituminous tar sands mining, and a phosphate oxide-hydroxide slime obtained from phosphate mining. However, it will be understood that this invention is directed generally to the destabilization of all such suspensions.

It has also been found, in accordance with the present invention, that when cement is added to the suspensions together with the aforedescribed composition, there is achieved improved permeability and shear strength of the resulting destabilized sludge.

DESCRIPTION OF THE DRAWING

The invention, both as to the manner in which the flocculants are prepared and the method of employing them, may best be understood by reference to the following description taken in connection with the drawing of which the single FIGURE is a schematic representation of a hot water extraction process wherein the invention finds particular use.

DETAILED DESCRIPTION OF THE INVENTION

Referring now to the single FIGURE, bituminous tar sands are fed into the system through a line 1 and pass to a conditioning drum or muller 18. Water and steam are introduced to the muller through another line 2. The total water so introduced in liquid and vapor form is a minor amount based on the weight of the tar sands processed. The tar sands, conditioned with water, pass through a line 3 to the feed sump 19 which serves as a zone for diluting the pulp with additional water before passage to the separation zone 20.

The pulp tar sands are continuously flushed from the feed sump 19 through a line 4 into a separator 20. The settling zone within the separator 20 is relatively quiescent so that bituminous froth rises to the top and is withdrawn via line 5 while the bulk of the sand settles to the bottom as a tailings layer which is withdrawn through line 6.

A middlings stream is withdrawn through line 7 to be processed as described below. Another middlings stream, which is relatively oil-rich compared to the stream withdrawn through line 7, is withdrawn from the cell via line 8 to a flotation scavenger zone 21. In this zone, an air flotation operation is conducted to cause the formation of additional oil froth which passes from the scavenger zone through line 9 in mixture with the primary froth from the separator 20 to a froth settler 22. An oil-lean water stream is removed from the bottom of the scavenger zone 21 through line 10 to be further processed as described below. In the settler sone 22, some further oil-lean water is withdrawn from the froth and removed through line 11 to be mixed with the oil lean water stream from the flotation scavenger zone, the sand tailings stream from the separation zone and a portion of the lower middlings withdrawn from the separation zone. The bitumen from the settler is removed through line 12 for further treatment.

The oil-lean water from the froth settler, the scavenger zone, and the separator, and the tailings from the settler, all of which make up an effluent discharge stream, are treated in the sand separation zone 20 by, for example, a simple gravity setting process. The sand is withdrawn by a line 13 and discarded, and a process water stream is withdrawn by a line 14 to the flocculation zone 24.

In the flocculation zone 24, a substantial amount of clay suspended in the process water is coagulated, and a slurry of coagulated clay and process water is withdrawn in line 15 to a centrifuge zone 25. In the centrifuge zone, coagulated clay is separated from the process water and discarded via line 16. Water substantially reduced in clay and sand content compared to the effluent discharge is recovered from the centrifuge zone and is recycled by a line 17 to be mixed with fresh water and charged into the hot water process.

PREPARATION OF THE HYDROLYZED STARCH

As aforementioned, the flocculant is prepared from a wheat, corn or potato starch, which has been hydrolyzed. The hydrolysis is achieved by simply heating the starch in the form of an aqueous suspension at about 85° to 95° C. and preferably at about 90° C. The starch should desirably be present in an amount of 1 gm to 5 gm per 100 ml of water, and preferably 2 to 3 gms. It has been found essential, in order to control the size of the starch particles, and prevent their swelling, to carry out the hydrolysis in the presence of certain selected salts, which act as an electrolyte and maintain the particle size within preferred dimensions.

Among the salts which may be employed for this purpose are salts of metals such as sodium, potassium, ammonium, magnesium, calcium and aluminum. The respective anions may be sulfates, acetates, chlorides, nitrates, chlorates, bromides, iodides, thiocyanates, phosphates and the like. Particularly effective for purposes of this invention, as applied to tar sands tailing ponds, is calcium aluminum phosphate wheat starch, although such other salts as $AlPO_4$, salts containing sodium, aluminum and phosphate ions and the like may also be used.

Although the salts may be added in their desired form, it has been found preferable to form the salt in situ, particularly where the salt is generally insoluble in water. Thus, for example, the preferred calcium aluminum phosphate salt is advantageously formed in situ by the addition of specified amounts of calcium hydroxide, aluminum sulfate, and sodium phosphate to the aqueous wheat starch hydrolysis medium. In any event, the resulting salt should desirably be present in amounts of about 10 to 30 gms per 100 gms of starch, and preferably 15 to 20 gms per 100 gms of starch.

In the case of treatment of known phosphate slimes from phosphate mining operations with the flocculant of this invention, it will be understood that the presence or addition of a phosphate such as sodium phosphate, is not necessary and may be omitted from the salt preparation.

It has also been found, in accordance with this invention, that when an alcohol, preferably a lower aliphatic alcohol having from 1 to 5 carbon atoms, such as methanol, ethanol, propanol or the like, is added to the hydrolysate, the size and effectiveness of the resulting flocculant material is enhanced and the process results further improved over that of other known flocculants.

The alcohol may be added to the starch hydrolysate in one of two ways: (1) by the simultaneous addition of the alcohol and the hydrolysate directly to the tailings pond water, or (2) by addition of the alcohol to the hydrolysate itself prior to its use in the tailings pond. In the latter case, since the alcohol is usually added to the hydrolysate in amounts in excess of what is actually needed, the overnight settling of the flocculant then advantageously permits the excess alcohol to be recovered by distillation or the like, and then recycled, thereby effecting certain obvious economies. The alcohol should be added in amounts of at least 1/10 to 1/5 the volume of the hydrolysate. Alternatively, but less preferred, there may be employed in place of the alcohol such other additives as acetone, yeast or lactic acid.

If desired, the resulting alcohol-treated hydrolysate may then be further treated by drying the same (i.e., by freeze drying, air drying, spin drying or the like), to remove essentially all water and provide a powder which is convenient to handle, store, and transport, yet which can be readily redispersed in water at the treatment site.

In a further embodiment of this invention it has been found that as applied to bituminous tar sands, the results obtained with the salt and alcohol-treated starch hydrolysate may be additionally enhanced by the introduction of powdered cement to the flocculant, preferably in the form of a dilute slurry in a concentration on the order of at least about 3 pounds of cement per hundred Imperial gallons of sludge containing 20% solids. The effect of the addition of powdered cement to the flocculant is to provide a rapidly settled sludge layer having improved shear strength and permeability characteristics.

In accordance with this embodiment of the invention, the wheat starch flocculant and cement are mixed with the effluent stream, preferably as separate or combined slurrys. The quantity of cement injected should be at least 3.0 pounds (and preferably 3.6 pounds or more) of cement per hundred Imperial gallons of sludge which may be expected to accumulate when the liquid fraction of the tar sands tailing stream is discharged into the pond and settled. The concentration of starch flocculants injected typically falls within the range 0.1 to 0.2 pounds per hundred Imperial gallons of sludge.

Initial treatment of an existing pond may require broadcasting of the necessary quantities of cement and/or starch flocculant over the surface of the pond (or by such other means as recirculation with injection into the recirculates stream) in order to bring the concentration of cement in the pond to at least 3.0 pounds per hundred Imperial gallons of sludge. "Sludge", for the purposes only of defining the concentrations of cement and starch flocculant required, may be more particularly defined as "normalized" sludge containing about 20% w/v solids. As previously noted, in an actual settling pond, the demarcation between a clarified water layer and a sludge layer is ill-defined and variable, and the characteristics of the sludge layer change from top to bottom such that it is necessary to calculate an "average normalized" sludge from samples from a pond to determine the minimum dosage of cement and starch flocculant.

Water from the clarified water layer may be withdrawn by a pump for recycle to be mixed with fresh water and charged into the hot water process.

The following examples are provided for purposes of illustrating but not limiting the scope of this invention with respect to the preparation and use of the starch flocculants.

SYNTHESIS OF HYDROLYZED WHEAT STARCH FLOCCULANT

Five grams of prime wheat starch (Supergel 1201-International Grain Products, Ltd., Canada) was weighed into a refluxing apparatus flask. Two hundred milliliters of aqueous solution containing calcium aluminum phosphate was added. The calcium aluminum phosphate was formed in situ in the presence of the starch in the aqueous solution by the addition of 0.617 gm of $Al_2(SO_4)_3.18H_2O$, 0.704 gm $Na_3PO_4.12H_2O$, and 0.463 gm $Ca(OH)_2$.

The suspension was refluxed at 90° C.±5° for two hours with simultaneous stirring. The hydrolysis was considered complete when the insoluble starch was converted into a colloidal solution. The volume was then made up to 250 ml with distilled water, thus giving a stock solution of 20,000 ppm of calcium aluminum phosphate wheat starch.

EXAMPLE I

A series of tubes containing 50 ml of tar sand sludge having a solids content of 10% were treated with 0.5 ml of the above calcium aluminum phosphate wheat starch, and, where indicated in the table below, alcohol or yeast. The sludge contained 0.25% bitumen. Half the tubes were centrifuged with the results as shown below in Table I. The remaining half of the tubes were allowed to settle by themselves, the results of which are also reported below in Table I.

TABLE I

| Tube | Wheat Starch ppm | ml | ADDITIVE Type | Amount ppm | ml | CEN-TRI-FUGA-TION[3] w/w[2] | SELF-SET-TLING[4] w/w[2] |
|---|---|---|---|---|---|---|---|
| 1[1] | — | — | None | — | — | 41.3 | 12.1 |
| 2 | 200 | 0.5 | Yeast | 80 | 0.05[5] | 50.7 | 16.2 |
| 3 | 200 | 0.5 | None | — | — | 43.3 | 15.1 |
| 4 | 200 | 0.5 | Alcohol | 1000 | 0.05 | 46.7 | 17.0 |
| 5 | 200 | 0.5 | Lactic Acid | 88 | 0.5[6] | 50 | 16.5 |

[1] control; 10% sludge only
[2] solids content; weight/weight
[3] 320 minutes
[4] 144 hours
[5] 8% yeast solution in water
[6] 0.88 lactic acid in water It will be evident from the above data that the solids content is superior to the control specimen when the sludge is treated with both wheat and additive, and centrifuges, and is clearly superior when the sludge is allowed to settle by itself.

A comparable series of runs were carried out using polyacrylamide as the flocculant. The results are shown in Table 2 below:

TABLE 2

Solids concentration in cake and supernatant upon sedimentation by centrifugation.*

| | Polyacrylamide Flocculant | | Initial Solids Conc., % | Final Solids Conc. % (W/W) | |
|---|---|---|---|---|---|
| Run | Type | Concentration | | Cake | Supernatant |
| 1 | None (untreated sludge) | | 10 | 40.1 | 2.3 |
| 2 | 1820A(anionic) | 200 ppm | 10 | 38.9 | 1.0 |
| 3 | 573C(cationic) | 200 ppm | 10 | 36.7 | 1.5 |

*for thirty minutes

When hydrolyzed wheat starch is employed under the same conditions, a clear supernatent with no solids content is obtained, thus demonstrating the superiority of the wheat starch of this invention over the polyacrylamides of the prior art.

EXAMPLE 2

To 250 ml of hydrolyzed calcium aluminum phosphate wheat starch of Example 1 was added ethyl alcohol (50 ml) and the mixture allowed to stand overnight. Substantially all excess alcohol was then removed in a Soxhelt extraction apparatus by heating the mixture to 80° C. for twenty minutes, and the residue was oven dried.

Following redispersal of the starch (2%) in water, two 50 ml samples of sludge having an initial solids content of 12% were then measured out. One was employed as a control. To the second sample was added 0.5 ml of the redispersed hydrolyzed calcium aluminum phosphate wheat starch (200 ppm).

After centrifugation of the two samples for 320 minutes, the following results were observed:

Control—12% w/w—supernatent not clear (solids1.4%).

Calcium aluminum phosphate Starch—28.1%—w/w—supernatent clear (no solids).

EXAMPLE 3

A phosphate slime, (Swift Silver City, Florida) having a solids content of 2.66% (w/w), and a pH of 6.34, was treated with the hydrolyzed starch of Examples 1. For comparative purposes, two commercially available polyacrylamide flocculants (Magnifloc 573C and 1820A, American Cyanamid Company) were also employed. The results of these runs are set forth below in Table 3.

TABLE 3

| Sample | Flocculant Dosage (ppm) | Solids Conc. after 3 Days Settling | Ave. Viscosity (Centipoise) |
|---|---|---|---|
| Untreated | — | 10.09 | 2.4 |
| Starch | 100 | 10.57 | 3.3 |
| Magnifloc 573A | 100 | 7.79 | 4.8 |
| Magnifloc 1820A | 100 | 6.31 | 7.7 |

The supernatent was clear in all samples, both treated and untreated.

It will be seen from the above results that the starch was clearly superior in terms of the amounts of solids settled. The significance of the viscosity is best understood when it is noted that the low viscosity for the untreated sample indicates that the solids are essentially dispersed, whereas the much higher viscosity for the polyacrylamide sample means that they are coagulated and thus will retain large amounts of water, whereas the viscosity of the wheat flocculated sample means that settling will not be significantly retarded, while at the same time it enables one to surcharge the settled mass with sand.

The principal components of the phosphate slime are as follows: carbonate-fluorapatite; quartz; montmorillonite; and attapulgite.

SYNTHESIS OF HYDROLYZED CORN AND POTATO STARCH FLOCCULANTS

To prepare the hydrolyzed starch, a 20,000 ppm stock solution was prepared by refluxing a mixture of the starch and an aqueous solution containing the requisite amount of salts in the same manner as for the wheat starch, above. The hydrolysis was considered complete when the insoluble starch was converted into a colloidal solution. A summary of the prepared starch flocculants is given in Table 4 as follows:

TABLE 4

Summary of Prepared Starch Flocculants from Corn and Potato Starches

| Run # | Type of Starch Flocculant | Nature and Concentration of Electrolyte Added |
|---|---|---|
| 1 | Na starch | 0.05 N NaOH |
| 2 | Ca starch | 0.05 N Ca(OH)$_2$ |
| 3 | Al starch | 0.10 N AlCl$_3$ |
| 4 | sodium aluminum starch | 0.05 N NaOH + 200 ppm Al* |
| 5 | calcium aluminum starch | 0.05 N Ca(OH)$_2$ + 200 ppm Al* |
| 6 | sodium aluminum phosphate starch | 0.05 N NaOH + 200 ppm Al* + 200 ppm PO$_4$** |
| 7 | calcium aluminum phosphate starch | 0.05 N Ca(OH)$_2$ + 200 ppm Al* + 200 ppm PO$_4$** |
| 8 | AlPO$_4$ starch | 0.1 NAlCl$_3$ + 200 ppm PO$_4$** |

*Al was added using Al$_2$(SO$_4$)$_3$ . 18 H$_2$O
**PO$_4$ was added using Na$_3$PO$_4$ . 12 H$_2$O In order to test the effectiveness of the synthesized starch flocculants, two sludge suspensions containing 5.5 and 17.3 wt.% solids, respectively, were employed. In addition, synthetic polyacrylamide flocculants were used for comparative purposes. Test criteria used were: refiltration rates, self-settling and sedimentation upon centrifugation at a relative centrifugal force of 790 g at the bottom of the tube for 30 minutes. The results of refiltration tests and preliminary tests on self-settling indicated that the starch flocculants prepared from potato starch were superior to those prepared from corn starch; therefore, Table 5 presents only the sedimentation-upon-centrifugation studies done with potato starch flocculants.

TABLE 5

Solids concentration in cake and supernatant upon sedimentation by centrifugation using different flocculants

| Treatment # | Flocculant Type | Concentration | Initial Solids Conc., % (W/W) | Final Solids % (W/W) Cake | Supernatant |
|---|---|---|---|---|---|
| Polyacrylamide Flocculants | | | | | |
| 1 | None (untreated sludge) | | 17.3 | 42.1 | 2.4 |
| 2 | 1820A (anionic) | 200 ppm | 17.3 | 39.9 | 1.1 |
| 3 | 573C (cationic) | 200 ppm | 17.3 | 37.7 | 1.7 |
| 4 | 1906N (non-ionic) | 200 ppm | 17.3 | 42.9 | 2.4 |
| Potato Starch Flocculants | | | | | |
| 5 | Na Starch | 200 ppm | 17.3 | 36.6 | 0.0 |
| 6 | Al Starch | 200 ppm | 17.3 | 35.8 | 0.0 |
| 7 | Sodium aluminum starch | 200 ppm | 17.3 | 37.0 | 0.0 |
| 8 | Calcium aluminum starch | 200 ppm | 17.3 | 36.3 | 0.0 |
| 9 | Sodium aluminum phosphate starch | 200 ppm | 17.3 | 41.7 | 0.0 |
| 10 | Calcium aluminum phosphate starch | 200 ppm | 17.3 | 41.9 | 0.0 |
| 11 | AlPO$_4$ starch | 200 ppm | 17.3 | 42.9 | 0.0 |
| 12 | None (untreated sludge) | | 5.5 | 35.4 | 0.4 |
| 13 | Sodium aluminum starch | 200 ppm | 5.5 | 36.0 | 0.2 |
| 14 | Calcium aluminum starch | 200 ppm | 5.5 | 35.6 | 0.2 |

From the data set forth in Table 5, it is evident that the starch flocculants are decidedly superior to the polyacrylamide flocculants vis-a-vis the quality of the resultant supernatant. For those in which no flocculants were used, the supernatant had up to 2.4 wt.% solids in it, whereas the runs in which the starch flocculants were employed with a 17.3 wt.% sludge concentration had no suspended solids in the supernatant at all. Among the starch flocculants, it appears that those starches containing AlPO$_4$ were the best. Further, it was found that the starch flocculants are equally effective on no-oil-removed sludge as in treating oil-removed sludge whereas the polyacrylamide flocculants were more effective on oil-removed than on no-oil removed sludge suspensions.

The invention claimed is:

1. A composition comprising a hydrolyzed starch obtained by the aqueous hydrolysis of wheat starch in the presence of insoluble metal salts formed in situ and an additive comprising a lower aliphatic alcohol, acetone, yeast, or lactic acid.

2. The composition according to claim 1 wherein the starch is wheat starch and the salt is a salt containing calcium, aluminum and phosphate ions.

3. The composition of claim 1 wherein the aqueous hydrolyzed starch is dried to form a water-redispersible solid.

4. A composition comprising a hydrolyzed wheat, corn, or potato starch obtained by the aqueous hydrolysis of starch in the presence of insoluble metal salts formed in situ.

5. The composition according to claim 4 wherein the starch is wheat starch and the salt is a salt containing calcium, aluminum and phosphate ions.

6. The composition according to claim 4 wherein the starch is potato starch and the salt is AlPO$_4$.

7. The composition of claim 4 wherein the starch is potato starch, the salt is AlPO$_4$ and an additive is present, said additive comprising a lower aliphatic alcohol, acetone, yeast, or lactic acid.

8. The composition of claim 4 wherein the aqueous hydrolyzed starch is dried to form a water-redispersible solid.

* * * * *